United States Patent Office 2,938,883
Patented May 31, 1960

2,938,883

CHLOROETHYLENE POLYMERS STABILIZED WITH MONOACRYLIC ESTERS OF HYDROXY PHENONES

William J. Raich, Midland, Mich., assignor to The Dow Chemical Company, Midland, Mich., a corporation of Delaware No Drawing. Filed Nov. 19, 1956, Ser. No. 622,769

6 Claims. (Cl. 260—45.85)

This invention relates to new organic compounds and to polymeric compositions containing the same. More particularly it relates to new organic compounds finding utility as light stabilizers for polymeric materials.

Many polymeric materials, such as the haloethylene polymers are known to be highly sensitive to the effects of elevated temperatures and of light and under prolonged exposure to heat and light may become so degraded and discolored as to be commercially useless. It has been common practice to blend certain compounds with the polymer to stabilize it against the degradative effects of heat and light. Several of such compounds, however, are highly colored materials which impart an objectionable initial color to the stabilized composition and this prevents the production of a commercially saleable white composition. Still other disadvantages of many of the previous compounds are a high odor level and volatility. Any odor in the stabilizer will be transferred to the stabilized composition. When volatile stabilizers are employed the stabilizers volatilize out of the composition leaving the composition in time unprotected against the degradative effects of light, particularly ultra-violet light. In addition all of the compounds vary in their ability to absorb ultra-violet light and it is impossible to predict the effectiveness of any particular compound with any degree of certainty, and in addition some of the initially useful compounds lose some of their effectiveness for absorbing ultra-violet light over a prolonged period of time.

In view of the above problems it would be desirable and it is the principal object of this invention to provide a new group of organic compounds having the stated utility.

It is a further object to provide a group of such compounds which have little or no color and have a low odor level.

Another object is to provide a group of such compounds which have low volatility.

The above and related objects are achieved by means of a group of monoacrylic esters having the general formula:

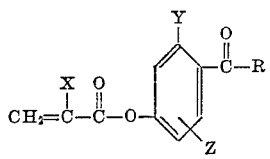

wherein R is selected from the group consisting of alkyl having from 1 to 10 carbon atoms, phenyl, and 2-hydroxyphenyl, X is selected from the group consisting of hydrogen and methyl, Y is selected from the group consisting of hydrogen and hydroxyl. Z is selected from the group consisting of hydrogen, halogen, and alkyl having from 1 to 4 carbon atoms, and wherein said ester has at least one hydroxyl group on a benzene ring in a position ortho to the carbonyl group. The objects are further realized with compositions comprising these esters together with haloethylene polymers.

The esters of this invention are easily prepared from readily available materials using conventional esterification reactions. In an illustrative prepartion a solution of one equivalent of 2,4-dihydroxybenzophenone and two equivalents of pyridine in benzene was stirred and cooled while 1.25 equivalents of methacryloyl chloride was slowly added. After a few minutes the solution was washed sequentially with water, dilute hydrochloric acid, and with a saturated aqueous sodium carbonate solution. The benzene solvent was evaporated under reduced pressure to yield a crude 2,4-dihydroxybenzophenone monomethacrylate as pale yellow needles melting at 68–72° C. The crude product was recrystallized from 95 percent ethanol and resulted in pale yellow needles melting at 77–78° C. and identified as 2,4-dihydroxybenzophenone-4-monomethacrylate. In a similar manner 2,4-dihydroxyacetophenone-4-monoacrylate was prepared and was in the form of white needles melting at 53–54° C. The product 2,4'-dihydroxybenzophenone-4'-monoacrylate prepared in like manner was in the form of a light yellow solid melting slightly below 30° C. Other esters falling within the scope of the above general formula may be prepared by substituting the corresponding starting materials in the reaction system.

It is imperative that only the monoester be prepared when a stabilization additive is desired, although trace amounts of the diester may be tolerated. However, a product which contains appreciable quantities of the diester has little stabilization effectiveness toward ultra-violet degradation of polymers and in addition it acts as a cross-linking agent in some instances resulting in altered physical properties in the haloethylene polymer formulation. If such a product is formed any diester may be removed by recrystallization or distillation. Also it is critical that only the 4 or 4'-monoester be prepared since the 2 or 2'-monoester has no noticeable stabilizing effectiveness. A trained investigator will be able to make a judicious choice of starting materials, reaction conditions, and procedures for preparing the 4 or 4'-monoester without resorting to any experimentation.

The monoesters of this invention are homopolymerizable in the presence of the usual free radial polymerization catalysts, such as the peroxides, to produce linear thermoplastic polymers. They are also copolymerizable with other monoethylenically unsaturated monomers, such as vinyl and vinylidene chlorides, vinyl acetate, acrylonitrile, and styrene, using the conventional polymerization techniques to give useful copolymers.

These monoesters are effective stabilizers for polymers and copolymers which are subject to degradation and discoloration upon prolonged exposure to ultra-violet light. The haloethylene polymers composed of at least 50 percent by weight of vinylidene chloride are known to be especially sensitive to the degradative effects of ultra-violet light and accordingly those polymers are preferred subjects for stabilization. The monoesters are effective stabilizers when employed in a concentration of from about 0.5 to about 10 precent by weight based upon the weight of the polymer used in the formulation. Compositions containing less than about 0.5 percent exhibit little more stability than unstabilized compositions. No beneficial result accrues from the use of more than 10 percent, and the cost and physical properties, such as strength, which are dependent largely on the polymer suffer.

The monoesters may, if desired, be blended with the polymer by any known post-polymerization formulating procedure, such as milling, dry blending, and similar procedures. However, since the monoesters are copolymerizable materials, they may be included as polymerizable components of the initial polymerization recipe. In that procedure the light stabilizing adjuvant becomes a permanent part of the polymer itself and cannot be leached or removed from the formulation except by chemical reaction. Additionally since most commercial polymerization reactions are conducted in aqueous dispersion with agitation there is good assurance that the monoester will be uniformly disturbed throughout the polymer. Uniform distribution of any additive throughout a polymer formulation using the conventional post-polymerization formulating techniques is a time consuming and costly operation.

The monoesters may be used in the polymer compositions in conjunction with the other common additives, such as pigments, fillers, heat stabilizers, and plasticizers. They likewise may be employed in combination with other known light stabilizers.

The advantages of the compositions of this invention will be more apparent from the following illustrative example wherein all parts and percentages are by weight.

EXAMPLE

A basic polymerization recipe was prepared from the following ingredients: 160 parts of water, 0.24 part of a water-soluble methyl cellulose as a granulating agent, 0.24 part of lauroyl peroxide as a polymerization catalyst, 68.8 parts of vinylidene chloride, and 9.6 parts of vinyl chloride. Several polymerizations were conducted using the basic recipe in a manner as will be described. In one case the basic recipe was polymerized, in another 1.6 parts of 2,4-dihydroxybenzophenone-4-monoacrylate was added to the recipe prior to polymerization; in another 1.6 parts of 2,4-dihydroxyacetophenone-4-monoacrylate was added prior to polymerization; in another was added 1.6 parts of 2,4-dihydroxybenzophenone-4-monomethacrylate; and to another was added 4-benzophenone methacrylate for comparison. The polymerizations were run by first mixing all monomeric materials and catalyst and dispersing them in the aqueous phase containing the granulating agent. Polymerization was initiated and maintained by warming the dispersion to 60° C. while agitated for 48 hours. Following polymerization the copolymer was isolated by filtration and then dried. Moldings were prepared from compositions consisting of 93 parts of the copolymers and 7 parts of alpha-alpha-diphenyl diethyl ether as a plasticizer. The moldings were exposed for 50 hours under S-4 ultra-violet lamps and the color of exposed molding noted. The results of that exposure are listed in Table I.

Table I

| Stabilizer | Color After Exposure |
| --- | --- |
| For Comparison: | |
| none | brown. |
| benzophenone-4-methacrylate | Do. |
| Stabilizers Of This Invention: | |
| 2,4-dihydroxybenzophenone-4-monoacrylate | tan. |
| 2,4-dihydroxyacetophenone-4-monoacrylate | light tan. |
| 2,4-dihydroxybenzophenone-4-monomethacrylate | Do. |

The samples of polymer were extracted in a Soxhlet extractor with methanol for 24 hours and then dried and blended with the same plasticizer, and molded as above. The moldings made from the extracted samples were exposed to S-4 ultra-violet sun lamps under the same conditions as the above unextracted samples. The results were identical to those reported above, showing that the stabilizer is a permanent part of the composition.

Similar results are obtained when the esters of this invention are employed as stabilizers with polyvinyl chloride.

I claim:

1. A light stable thermoplastic composition comprising chloroethylene polymer and from 1 to 10 percent of the weight of said polymer of an ester having the general formula:

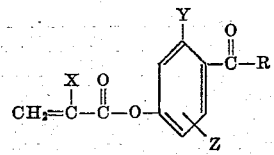

wherein R is selected from the group consisting of alkyl, phenyl, and 2-hydroxyphenyl, X is selected from the group consisting of hydrogen and methyl, Y is selected from the group consisting of hydrogen and hydroxyl and is hydroxyl when R is other than 2-hydroxyphenyl, and Z is selected from the group consisting of hydrogen, halogen, and alkyl.

2. The composition claimed in claim 1 wherein said ester is copolymerized within the structure of said polymer.

3. The composition claimed in claim 2 wherein said chloroethylene polymer is a copolymer composed of at least 50 percent by weight of vinylidene chloride with the remainder of a copolymerizable monoethylenically unsaturated monomer.

4. The composition claimed in claim 1 wherein said ester is 2,4-dihydroxybenzophenone-4-monomethacrylate.

5. The composition claimed in claim 1 wherein said ester is 2,4-dihydroxyacetophenone-4-monoacrylate.

6. The composition claimed in claim 1 wherein said ester is 2,4'-dihydroxybenzophenone-4'-monoacrylate.

References Cited in the file of this patent

UNITED STATES PATENTS

| | | |
| --- | --- | --- |
| 2,264,291 | Boyer et al. | Dec. 2, 1941 |
| 2,345,006 | Ross et al. | Mar. 28, 1944 |
| 2,423,089 | Filachione et al. | July 1, 1947 |
| 2,425,523 | Filachione et al. | Aug. 12, 1947 |
| 2,477,293 | Filachione et al. | July 26, 1949 |
| 2,579,079 | Tawney | Dec. 18, 1951 |
| 2,818,401 | Forster | Dec. 31, 1957 |

FOREIGN PATENTS

| | | |
| --- | --- | --- |
| 738,954 | Great Britain | Oct. 19, 1955 |